March 31, 1953     V. BAUTISTA     2,633,026
PRESSURE GAUGE
Filed March 12, 1951
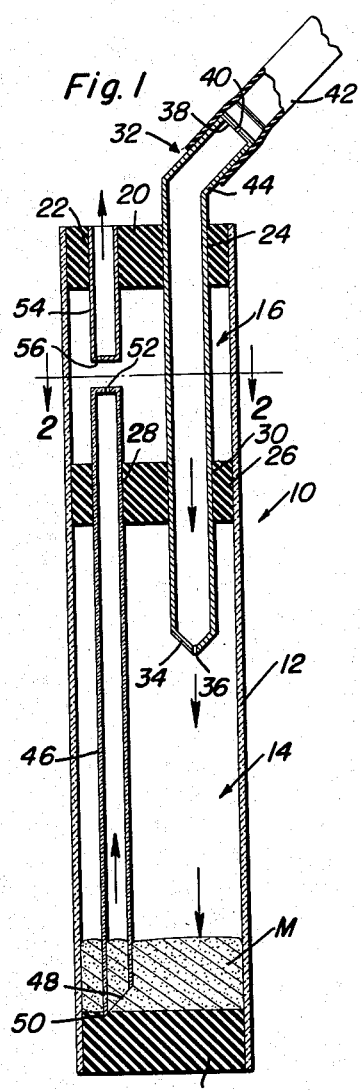
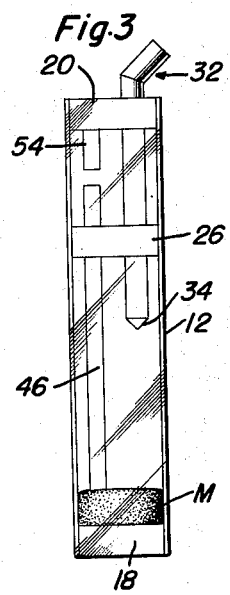
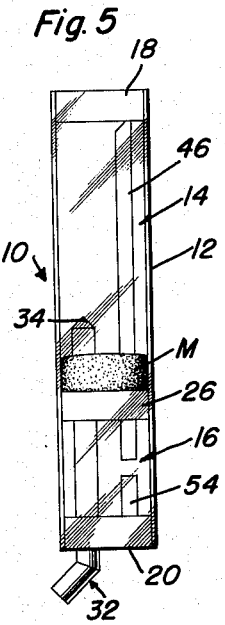
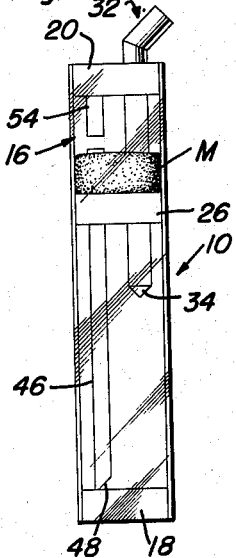
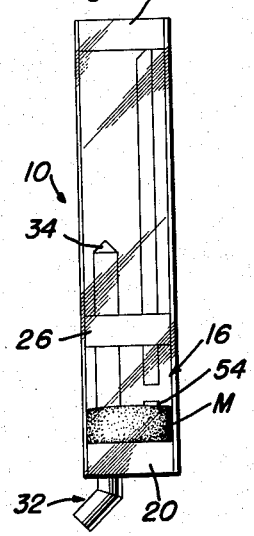
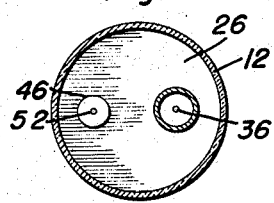
Valentine Bautista
INVENTOR.
BY *[signatures]*
Attorneys Patented Mar. 31, 1953

2,633,026

UNITED STATES PATENT OFFICE 2,633,026

PRESSURE GAUGE

Valentine Bautista, Chicago, Ill.

Application March 12, 1951, Serial No. 215,045

1 Claim. (Cl. 73—401)

The present invention relates to improvements in pressure gauges and more particularly to a mercury-type gauge having a calibrating tube therein for the measurement of gas pressures.

An object of the present invention is to provide an improved pressure gauge which is of simple construction, the gauge being comprised of a tubular casing having end disks mounted therein and an intermediate disk dividing the casing into a pair of chambers, one being the pressure chamber which is in communication with the source of pressure, and the other chamber being the exhaust chamber and trap which is in free open communication with the atmosphere and the upper end of the calibrated tube whereby the mercury disposed in the pressure chamber can be forced into the calibrated tube in response to a pressure rise in the pressure chamber, the air in the calibrated tube above the mercury being exhausted into the exhaust chamber and thence to the atmosphere.

A further object of the present invention resides in the provision of a pressure tube extending through the exhaust chamber and the end disk and the intermediate disk defining the same, the pressure tube having its outlet end terminating in the pressure chamber and of conical form with a reduced diameter outlet, whereby when the gauge is in an inverted position, little or no mercury will pass into the inlet pressure tube.

Still another object of the present invention resides in the provision of the pressure calibrated tube which is disposed adjacent a side wall of the casing with a lower open end adapted to receive mercury therein, the lower end of the pressure calibrated tube having an angular cut providing an opening whereby when the gauge is tipped and inverted, the mercury will pass from the calibrated tube, thereby precluding the possibility of losing mercury through the calibrated tube into the exhaust chamber.

Other objects of the present invention are to provide reduced diameter openings in the ends of the pressure calibrated tube and exhaust tube disposed within the exhaust chamber whereby the amount of mercury passing through to the atmosphere can be substantially reduced.

Various other objects and advantages will become apparent from the detailed description to follow.

The best form in which I have contemplated applying my invention is clearly illustrated in the accompanying drawings, wherein:

Figure 1 is a vertical sectional view through the pressure gauge, the gauge being shown in its normal operating position with a pressure hose connected to the pressure tube and supplying pressure on the upper surface of the mercury disposed within the pressure chamber;

Figure 2 is a horizontal sectional view taken substantially along the plane of line 2—2 of Figure 1;

Figure 3 is a side elevational view of the pressure gauge of Figure 1;

Figure 4 is a view similar to Figure 3 but wherein the mercury has been forced from the pressure chamber into the exhaust chamber and trapped as a result of the excess pressure in the pressure chamber;

Figure 5 is a view of the pressure gauge in inverted position from that shown in Figure 3; and Figure 6 is a view of the pressure gauge in an inverted position from that shown in Figure 4.

Referring more particularly to the drawings, wherein like numerals designate like parts throughout, the numeral 10 designates generally the pressure gauge of the present invention which is comprised of a tubular casing 12 of transparent material and divided into a pair of chambers, one being the pressure chamber 14 and the other being the exhaust chamber and trap 16.

The means for defining the pressure chamber 14 and the exhaust chamber and trap 16 includes a pair of end disks 18 and 20 which are disposed in the ends of the casing 12, the disk 18 being of imperforate form while the disk 20 has a pair of bores 22 and 24 longitudinally formed therein. In an intermediate portion of the tubular casing 12 is disposed a third disk 26 which has a pair of bores 28 and 30 in axial alignment with the bores 22 and 24 respectively.

The pressure chamber 14 is provided with a predetermined amount of mercury M. The means for supplying pressure into the pressure chamber 14 and for subjecting the mercury M to pressure on its upper surface comprises the pressure tube 32 which extends through the aligned bores 24 and 30 and terminates within the pressure chamber 14 with a conical end 34 having a reduced diameter outlet opening 36. The outer end of the pressure tube 32 has an end wall 38 provided with a reduced diameter inlet opening 40 for communication with the source of pressure. The resilient and flexible tube 42 is connected to the source of pressure to be measured and is engaged over the upper angulated end portion 44 of the pressure tube 32.

A pressure calibrated tube 46, i. e., a tube provided with scale means or graduations (not shown), is carried by the bore 28 in the disk 26 and has its lower end formed with an angular cut 48, the pointed end 50 of the calibrated tube 46 being engaged in the disk 18 for support thereby. The mercury M will, of course, be able to enter the calibrated tube 46 through the lower open end thereof. The upper end of the calibrated tube 46 is formed with a reduced diameter opening 52, the opening 52 communicating the interior of the calibrated tube 46 with the exhaust chamber and trap 16.

The exhaust chamber 16 is in open communication with the atmosphere by means of the exhaust tube 54 which has its inner end formed with the reduced diameter aperture 56.

In view of the foregoing description of the structure of the pressure gauge as shown in Figures 1 and 2, it will be seen that the pressure chamber 14 is supplied with pressure from the source of pressure by means of the tube 42 and pressure tube 32, the upper surface of the mercury M will be subjected to a pressure which will force mercury into the calibrated tube 46, the mercury rising in the tube 46 to a height commensurate with the pressure acting upon the mercury within the pressure chamber 14. A reading of the calibrations on the tube 46 will indicate the amount of pressure at the source of pressure.

Figure 3 shows the pressure gauge with the mercury rising in the calibrated tube to indicate the pressure. Figure 4 shows the pressure gauge of Figure 3 after the pressure in the pressure chamber 14 has risen to a point where all of the mercury has been forced through the calibrated tube 46 into the pressure chamber and trap 16. It will be seen that although pressure is continually applied by means of the pressure tube 32, the pressure will be exhausted to atmosphere by passing through the calibrated tube 46 and thence through the exhaust tube 54.

Looking now at Figure 5, it will be seen that when the pressure gauge is inverted, the mercury will flow from the position shown in Figure 1 to the position shown in Figure 5 and will rest on the intermediate disk 26. While the pressure gauge is being inverted, a certain amount of mercury will strike the conical end of the pressure tube 32 and but a very minute quantity of mercury can pass into the pressure tube, if any. Thus, it will be seen that the pressure gauge can be readily inverted without fear of loss of mercury.

When the mercury has been forced from the pressure chamber into the exhaust chamber and trap 16 and the pressure gauge is then inverted, it will be seen that the mercury will assume the position shown in Figure 6. However, the amount of mercury lost as a result of the inverting of the pressure gauge will be relatively small in view of the fact that the exhaust tube 54 extends into the pressure chamber and trap 16 a predetermined length whereby the mercury M will be retained on the end disk 20 and below the opening 56 in the exhaust tube 54.

It is also pointed out that with the positioning of the exhaust tube 54 adjacent the wall of the casing 12, the pressure gauge can be manipulated from an upright position to an inverted position without having the mercury passing over the opening 56 in the exhaust tube 54, thereby substantially eliminating the possibility of loss of mercury through that exhaust tube.

The calibrated tube 46 is of a diameter substantially less than that of the pressure tube 32 whereby a reduced quantity of mercury is necessary for indicating the pressure or pressure changes.

When it is desired to control the pressure within a chamber, the pressure gauge of the present invention can be employed so that when the pressure in the chamber reaches a predetermined amount, the mercury will be forced into the exhaust chamber and trap whereby the excess pressure will be exhausted to atmosphere.

In view of the foregoing, it is believed that a device has been provided which will accomplish all of the objects hereinabove set forth. Inasmuch as the pressure tube 32 is removable, the chances for breakage, loss or wear of parts are substantially reduced. Furthermore, when mercury has been forced into trap 16, as shown in Figure 4, the mercury can be returned to the pressure chamber 14 by moving pressure tube 32 outwardly until its inner end is disposed in the chamber 16 and free communication between the chambers is provided by aperture 30. The mercury can then be removed to the pressure chamber and the pressure tube inserted into the opening 30.

Complete removal of the tube 32 from the disks 26 and 20 can be effected when it is desired to completely drain the mercury from the gauge.

Having described the invention, what is claimed as new is:

A pressure mercury gauge comprising a tubular upright transparent casing provided with a pair of upper and lower end disks fixed therein and closing the ends of the casing, and a partitioning disk fixed therein intermediate said pair of disks and dividing said casing into a lower pressure chamber adapted to contain mercury and an upper trapping chamber for the mercury, said upper end disk being provided with a pair of bores at opposite sides thereof, and the intermediate disk being provided with a like pair of bores at opposite sides thereof vertically aligned with the bores in said upper end disk, an air pressure tube extending downwardly through the aligned bores at one side of the upper end and intermediate disk and through the trapping chamber into the pressure chamber, a calibrated tube extending upwardly out of said pressure chamber through the bore at the other side of said intermediate disk part way into said trapping chamber and adapted to pass the mercury therethrough from said pressure chamber into said trapping chamber, and an air pressure exhaust tube extending downwardly through the other bore in the upper end disk part way into the trapping chamber in vertical alignment with said calibrated tube, said pressure tube being slidable upwardly to open the bore in the intermediate disk through which it extends for return of mercury in the trapping chamber back into the pressure chamber.

VALENTINE BAUTISTA.

REFERENCES CITED

The following references are of record in the file of this patent:

UNITED STATES PATENTS

| Number | Name | Date |
|---|---|---|
| 903,973 | Heiland | Nov. 17, 1908 |
| 917,596 | Hanly | Apr. 6, 1909 |
| 989,691 | Boekel | Apr. 18, 1911 |
| 1,240,123 | Cotton | Sept. 11, 1917 |
| 1,697,717 | Corwin | Jan. 1, 1929 |
| 1,848,233 | Swope et al. | Mar. 8, 1932 |
| 2,111,221 | Mitchell | Mar. 15, 1938 |

FOREIGN PATENTS

| Number | Country | Date |
|---|---|---|
| 8,183 | Austria | July 10, 1902 |